United States Patent
Ochi (10) Patent No.: US 9,604,506 B2
(45) Date of Patent: Mar. 28, 2017

(54) TIRE

(75) Inventor: Naoya Ochi, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 920 days.

(21) Appl. No.: 13/814,047

(22) PCT Filed: Aug. 4, 2011

(86) PCT No.: PCT/JP2011/067865
§ 371 (c)(1),
(2), (4) Date: Feb. 4, 2013

(87) PCT Pub. No.: WO2012/018081
PCT Pub. Date: Feb. 9, 2012

(65) Prior Publication Data
US 2013/0133798 A1 May 30, 2013

(30) Foreign Application Priority Data
Aug. 5, 2010 (JP) .................. 2010-176490

(51) Int. Cl.
*B60C 11/11* (2006.01)
*B60C 11/12* (2006.01)
*B60C 11/03* (2006.01)

(52) U.S. Cl.
CPC .......... *B60C 11/12* (2013.01); *B60C 11/0302* (2013.04); *B60C 11/11* (2013.01);
(Continued)

(58) Field of Classification Search
CPC ................. B60C 11/12; B60C 11/0302; B60C 2011/0372; B60C 2011/0388;
(Continued)

(56) References Cited

U.S. PATENT DOCUMENTS 5,178,699 A * 1/1993 Kakumu .................. B60C 11/00
152/209.18
6,102,093 A * 8/2000 Nakagawa ............... B60C 11/11
152/209.18
(Continued)

FOREIGN PATENT DOCUMENTS

EP 1 008 465 A2 6/2000
EP 1 950 060 A1 7/2008
(Continued)

OTHER PUBLICATIONS

Machine Translation: JP 06234306 A; Diensthuber, Franz; no date.*
(Continued)

*Primary Examiner* — Steven D Maki
*Assistant Examiner* — Kendra Ly
(74) *Attorney, Agent, or Firm* — Sughrue Mion, PLLC (57) ABSTRACT

In a tread part (1), a tilted land portion (200) is divided into multiple blocks by a tilted narrow groove (300) and branched narrow grooves (350). Tilted main grooves (100) include an upper tilted main groove (101) and a lower tilted main groove (102). The branched narrow grooves (350) include first branched narrow grooves (350*a*) and second branched narrow grooves (350*b*). First blocks (210) and second blocks (220) have quadrilateral or pentagonal shapes. Of the first blocks (210), one first block and another first block adjacent to the one first block in a tilt direction KC have the same shape. Of the second blocks (220), one second block and another second block adjacent to the one second block in the tilt direction KC have the same shape.

11 Claims, 8 Drawing Sheets

(52) U.S. Cl.
CPC . *B60C 2011/036* (2013.04); *B60C 2011/0372* (2013.04); *B60C 2011/0374* (2013.04); *B60C 2011/0388* (2013.04); *B60C 2011/1209* (2013.04); *B60C 2011/1245* (2013.04)

(58) Field of Classification Search
CPC ....... B60C 2011/036; B60C 2011/0374; B60C 2011/1245; B60C 2011/1213; B60C 2011/1286; B60C 2011/1277; B60C 2011/1254
USPC ........................................ 152/209.28, 209.18
See application file for complete search history.

(56) References Cited

U.S. PATENT DOCUMENTS

| | | | |
|---|---|---|---|
| 2010/0038002 A1* | 2/2010 | Wen | B60C 11/0302 152/209.16 |
| 2010/0236680 A1 | 9/2010 | Mukai | |

FOREIGN PATENT DOCUMENTS

| | | | |
|---|---|---|---|
| GB | 2 261 195 A | | 5/1993 |
| JP | 2-141314 A | | 5/1990 |
| JP | 6-171317 A | | 6/1994 |
| JP | 06234306 A | * | 8/1994 |
| JP | 7-117416 A | | 5/1995 |
| JP | 7-223409 A | | 8/1995 |
| JP | 09323511 A | * | 12/1997 |
| JP | 2000-135904 A | | 5/2000 |
| JP | 2000-225815 A | | 8/2000 |
| JP | 2001-322406 A | | 11/2001 |
| JP | 2008-155817 A | | 7/2008 |
| JP | 2009-101850 A | | 5/2009 |

OTHER PUBLICATIONS

Machine Translation: JP 09323511 A; Tagashira, Kenji; no date.*
Extended European Search Report, dated May 20, 2014, issued in counterpart European Patent Application No. 11814706.5.
International Search Report for PCT/JP2011/067865 dated Nov. 8, 2011.
Japanese Official Action Letter, dated Nov. 4, 2014, issued in counterpart Japanese Patent Application No. 2012-527768.

* cited by examiner

FIG. 8

# TIRE

CROSS REFERENCE TO RELATED APPLICATIONS

This application is a National Stage of International Application No. PCT/JP2011/067865 filed Aug. 4, 2011, claiming priority based on Japanese Patent Application No. 2010-176490 filed Aug. 5, 2010, the contents of all of which are incorporated herein by reference in their entirety.

TECHNICAL FIELD

The present invention relates to a tire including multiple tilted main grooves which are tilted with respect to the tread width direction and blocks which are defined by the tilted main grooves.

BACKGROUND ART

Heretofore, pneumatic tires designed to satisfy both drainage performance on wet road surfaces and braking and driving performance on low-μ road surfaces such as icy road surfaces and snowy road surfaces (hereinafter, abbreviated as the low-μ-road performance when necessary) have been known (see Patent Document 1, for example).

Such a pneumatic tire includes multiple tilted main grooves which are tilted with respect to the tread width direction and blocks which are defined by the tilted main grooves. By increasing the size of each block, the contact area with the road surface and the block rigidity are secured, thereby improving the low-μ-road performance. Moreover, by forming many sipes in each block, the edge effect is enhanced, and the drainage performance of the block is improved as well.

PRIOR ART DOCUMENT

Patent Document

Patent Document 1: Japanese Patent Application

SUMMARY OF THE INVENTION

In the pneumatic tire mentioned above, the rigidity of each block is lowered because of the formation of many sipes in the block. Thus, part of the block falls when coming into contact with the road surface, thereby making it impossible to achieve low-μ-road performance that reflects the size of the block provided to secure the ground contact area.

Moreover, since the size of the block is increased so as to secure the ground contact area, it is impossible to efficiently remove a water film in a center region of the block. This deteriorates the contact between the pneumatic tire and the road surface. Thus, there is still room for improvement in the braking and driving performance on low-μ road surfaces.

Thus, the present invention has been made in view of the above circumstances, and an objective thereof is to improve the braking and driving performance of a tire on low-μ road surfaces while maintaining or improving the drainage performance, the tire including multiple tilted main grooves which are tilted with respect to the tread width direction and blocks which are defined by the tilted main grooves.

In order to solve the above-mentioned problem, the present invention has features as described below. The feature of the present invention is summarized as a tire comprising, in a tread part (e.g., tread part 1): a plurality of tilted main grooves (tilted main groove 100) tilted with respect to a tread width direction as viewed in a tire radial direction and arranged side by side in a tire circumferential direction; a tilted land portion (tilted land portion 200) sandwiched between the tilted main grooves and extending along the tilted main grooves; a tilted narrow groove (tilted narrow groove 300) formed in the tilted land portion, extending in a tilt direction (tilt direction KC), and dividing the tilted land portion, the tilt direction being an extending direction of the tilted main groove; and a plurality of branched narrow grooves (branched narrow groove 350) formed in the tilted land portion and extending to the tilted main grooves from the tilted narrow groove, wherein the tilted land portion is divided into a plurality of blocks (e.g., block 201) by the tilted narrow groove and the branched narrow grooves, the tilted main grooves include one tilted main groove (upper tilted main groove 101) and another tilted main groove (lower tilted main groove 102) given adjacent to the one tilted main groove and sandwiching the tilted land portion therebetween, the branched narrow grooves include a plurality of first branched narrow grooves (first branched narrow grooves 350a) and a plurality of second branched narrow grooves (second branched narrow grooves 350b), the first branched narrow grooves being open to the tilted narrow groove and the one tilted main groove, the second branched narrow grooves being open to the tilted narrow groove and the other tilted main groove, the blocks include a plurality of first blocks (first blocks 210) and a plurality of second blocks (second blocks 220), the first blocks being surrounded by the tilted main groove, the tilted narrow groove, and the first branched narrow grooves, the second blocks being surrounded by the tilted main groove, the tilted narrow groove, and the second branched narrow grooves, the first blocks and the second blocks have quadrilateral or pentagonal shapes as viewed in the tire radial direction, of the first blocks, one first block (e.g., block 203) and another first block (e.g., block 205) adjacent to the one first block in the tilt direction have the same shape, and of the second blocks, one second block (e.g., block 204) and another second block (e.g., block 206) adjacent to the one second block in the tilt direction have the same shape.

According to the features of the present invention, the tilted land portion is divided into multiple blocks by the tilted narrow groove and the branched narrow grooves. Thus, formed are multiple blocks smaller than those of the conventional pneumatic tires designed to achieve improvement in drainage performance and low-μ road performance. Accordingly, the number of block edges can be increased and the low-μ road performance can therefore be improved without forming many sipes in large blocks.

When the blocks are large, it is possible that the ground pressure may be different from one portion to another within a block. However, making the blocks small helps the ground pressure become uniform within a block. This improves the ground contact of the block. The resultant surface friction effect between the road surface and the block can therefore improve the low-μ road performance.

Moreover, the adjacent first blocks have the same shape, and the adjacent second blocks have the same shape. This makes the ground pressure uniform between the adjacent blocks. The blocks can therefore improve the ground contact as a whole. As a result, the low-μ road performance can be improved.

Meanwhile, the blocks may not be able to be arranged densely in the tilted land portion if the tilted land portion is divided into polygonal blocks with a large number of sides. For example, the blocks may be arranged densely in the case of hexagonal blocks; nonetheless, such blocks cannot be aligned neatly along the lateral sides of the tilted land portion that are in contact with the tilted main grooves. This reduces the ground contact area of the blocks accordingly. In contrast, in the tire according to the present invention, the tilted land portion is divided into blocks with a small number of sides, i.e. quadrilateral and/or pentagonal blocks. This allows the blocks to be aligned neatly along the lateral sides of the tilted land portion and therefore allows the blocks to be arranged densely in the tilted land portion. Thus, a ground contact area as large as a large block can be ensured. Accordingly, the low-μ road performance can be improved.

The tire according to the present invention includes multiple tilted main grooves. Accordingly, the drainage performance can be maintained. In addition, a water film between a center region of the tilted land portion and the road surface is removed through the tilted narrow groove and the branched narrow grooves. Accordingly, the braking and driving performance on low-μ road surfaces can be improved while the drainage performance is maintained or improved.

The other feature of the present invention is summarized as, an area of surfaces of the first blocks and the second blocks in contact with a road surface is between 100 mm$^2$ and 250 mm$^2$ both inclusive.

The other feature of the present invention is summarized as the tilted narrow groove extends in a zigzag shape in the tilt direction.

The other feature of the present invention is summarized as, a tilt angle (tilt angle θ) of the tilted main grooves with respect to the tread width direction as viewed in the tire radial direction is between 15 degrees and 75 degrees both inclusive.

The other feature of the present invention is summarized as the tire further comprises a circumferential main groove (circumferential main groove 150) extending in the tire circumferential direction.

The other feature of the present invention is summarized as, each of the tilted main grooves extends while bending, and a tilt angle of the tilted main groove with respect to the tread width direction changes partially.

The other feature of the present invention is summarized as, at least one of the tilted narrow groove and the branched narrow grooves is a sipe that is closable when the tilted land portion in which the tilted narrow groove and the branched narrow grooves are formed comes into contact with the ground.

The other feature of the present invention is summarized as, the tire further comprises a plurality of outer tilted grooves (outer tilted grooves 130) arranged on an outer side in the tread width direction and an outer land portion sandwiched between the outer tilted grooves in the tire circumferential direction and extending along the outer tilted grooves, the tilted main grooves are formed on an inner side, in the tread width direction, of the outer tilted grooves, and a tilt angle (outer-groove angle φ) of the outer tilted grooves with respect to the tread width direction as viewed in the tire radial direction is smaller than a tilt angle of the tilted main grooves with respect to the tread width direction.

The other feature of the present invention is summarized as, the tilted narrow groove extends in a zigzag shape in the tilt direction by alternately turning toward the one tilted main groove side and the other tilted main groove side, and when portions at which the tilted narrow groove turns are regarded as vertices (vertices 310), the branched narrow grooves extend to the tilted main grooves only from the vertices.

The other feature of the present invention is summarized as, the first branched narrow grooves and the second branched narrow grooves are formed alternately in the tilt direction.

The other feature of the present invention is summarized as, the tilted main grooves include a first tilted main groove (first tilted main groove 100a) and a second tilted main groove (second tilted main groove 100b), the first tilted main groove being arranged on one of outer sides in the tread width direction with respect to a tire equator line (tire equator line CL), the second tilted main groove being arranged the other of the outer sides in the tread width direction with respect to the tire equator line, and a land portion (land portion 235) or the blocks being formed on the tire equator line and extending along the tire equator line is arranged between an inner end portion (first-tilted-main-groove end portion 105a), in the tread width direction, of the first tilted main groove and an inner end portion (second-tilted-main-groove end portion 105b), in the tread width direction, of the second tilted main groove.

MODES FOR CARRYING OUT THE INVENTION

Some examples of a tire according to the present invention will be described with reference to the drawings. Specifically, description will be given of (1) Configuration of Tread Part 1, (2) Modifications of Tread Part 1, (3) Comparative Evaluations, (4) Operations and Effects, and (5) Other Embodiments.

Note that, in the following description of the drawings, the same or similar reference numerals denote the same or similar portions. However, it should be noted that the drawings are schematic, and dimensional ratios and the like are different from the actual ones. Therefore, specific dimensions and the like should be determined in consideration of the following description. Moreover, the drawings also include portions having different dimensional relationships and ratios from each other.

(1) Configuration of Tread Part 1

Figure 1:
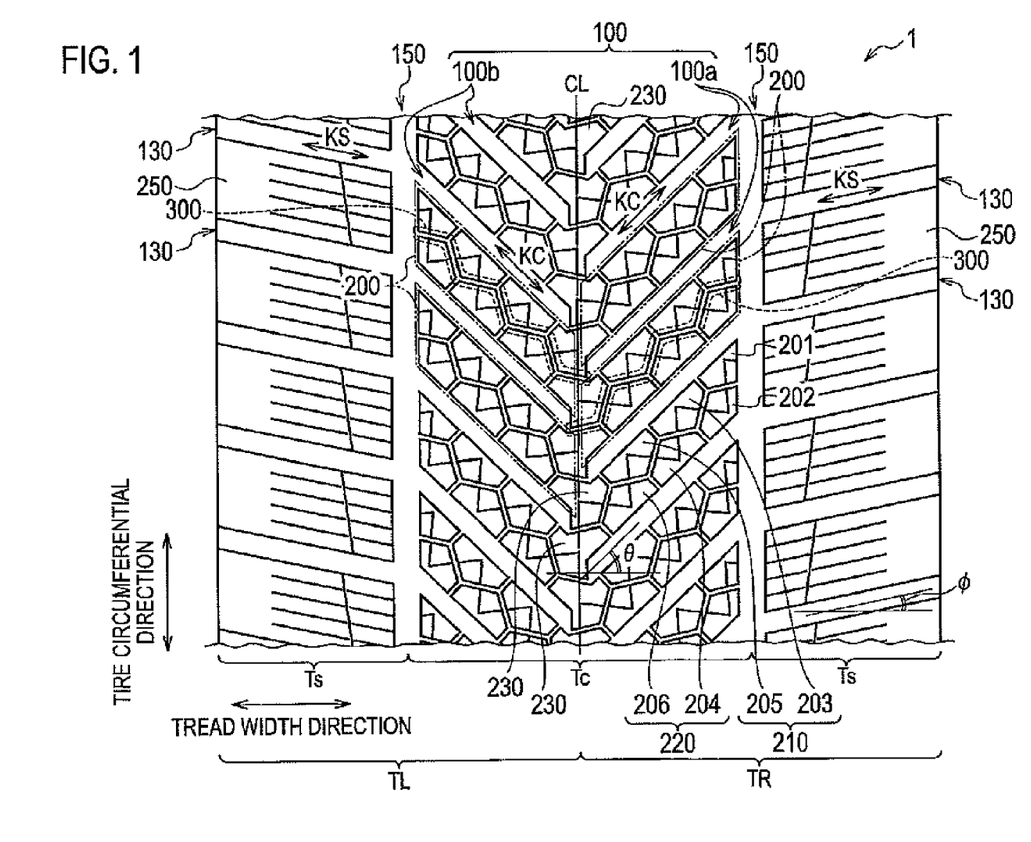
FIG. 1 is a developed view of the tread of a tire according to an embodiment.
Figure 2:
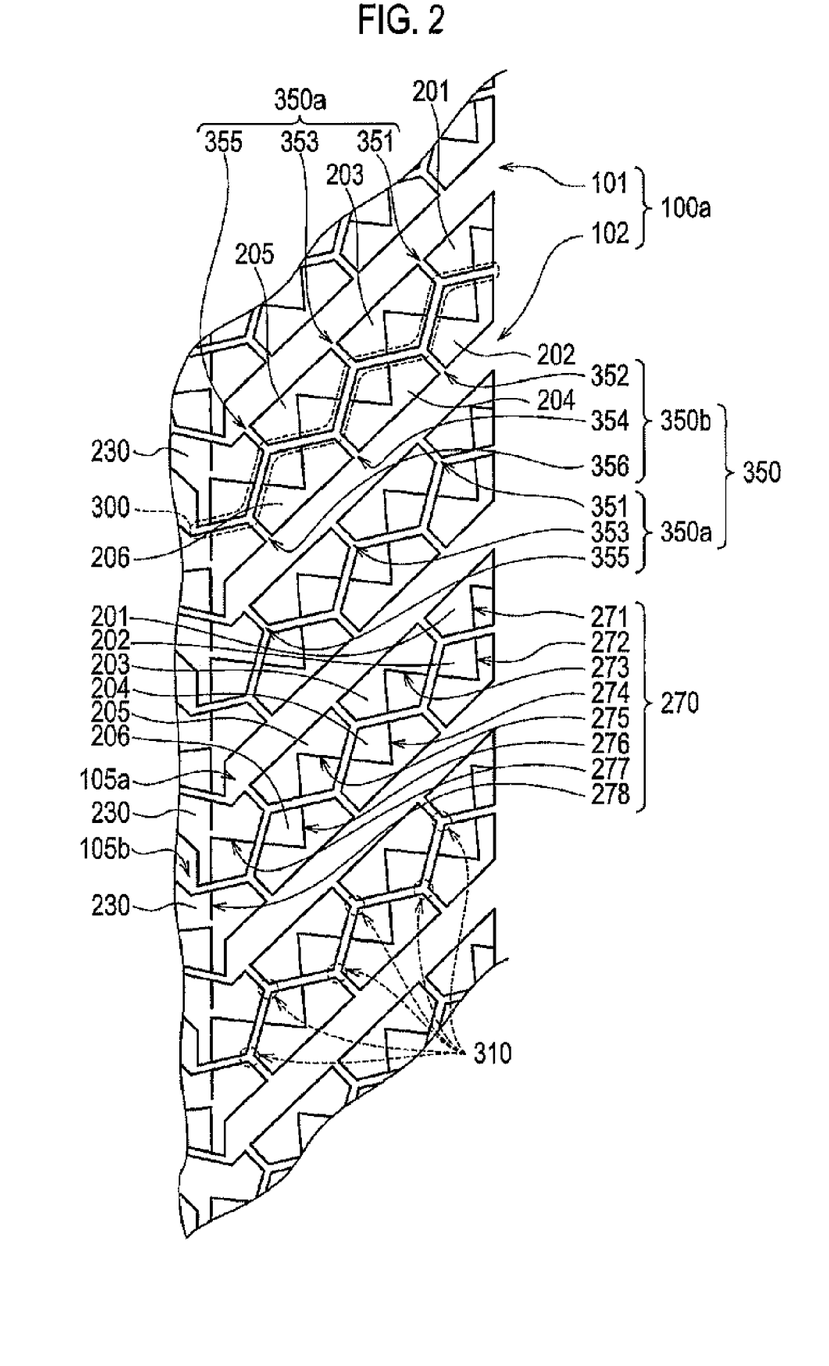
FIG. 2 is a partial enlarged view of FIG. 1.

The configuration of a tread part 1 of a tire according to an embodiment will be described with reference to FIGS. 1 and 2. FIG. 1 is a developed view of the tread of the tire according to the embodiment. FIG. 2 is a partial enlarged view of FIG. 1.

As shown in FIGS. 1 and 2, the tire according to the embodiment includes a tilted main groove 100, an outer tilted groove 130, a circumferential main groove 150, a tilted land portion 200, an outer land portion 250, a tilted narrow groove 300, and a branched narrow groove 350. The tire according to the embodiment includes multiple tilted main grooves 100 which are tilted with respect to the tread width direction and blocks which are defined by the tilted main grooves 100.

Each tilted main groove 100 is tilted with respect to the tread width direction as viewed in the tire radial direction. The multiple tilted main grooves 100 are arranged side by side in the tire circumferential direction. The tilted main grooves 100 are arranged in a tread center region Tc. In FIG. 1, the tilted main grooves 100 include: a first tilted main groove 100*a* which is arranged in a right tread part TR on one of the outer sides in the tread width direction with respect to a tire equator line CL; and a second tilted main groove 100*b* which is arranged in a left tread part TL on the other of the outer sides in the tread width direction with respect to the tire equator line CL. The tilted main grooves 100 extend in a tilt direction KC. The tilted main grooves 100 extend straightly. The tilted main grooves 100 include: one tilted main groove 100; and another tilted main groove 100 given adjacent to the one tilted main groove 100 in the tire circumferential direction and sandwiching the tilted land portion 200 therebetween. As shown in FIG. 2, the one tilted main groove 100 is an upper tilted main groove 101. The upper tilted main groove 101 is the tilted main groove 100 on the upper side of the tilted land portion 200. The other tilted main groove 100 is a lower tilted main groove 102. The lower tilted main groove 102 is the tilted main groove 100 on the lower side of the tilted land portion 200.

A first-tilted-main-groove end portion 105*a* is an inner end portion of the first tilted main groove 100*a* in the tread width direction. As shown in FIGS. 1 and 2, a block 230 is arranged on the inner side, in the tread width direction, of the first-tilted-main-groove end portion 105*a*. A second-tilted-main-groove end portion 105*b* is an inner end portion of the second tilted main groove 100*b* in the tread width direction. A block 230 is arranged on the inner side, in the tread width direction, of the second-tilted-main-groove end portion 105*b*. A block 230 is arranged between the first-tilted-main-groove end portion 105*a* and the second-tilted-main-groove end portion 105*b*. That is, the first-tilted-main-groove end portion 105*a* is not connected to the second tilted main groove 100*b*. The second-tilted-main-groove end portion 105*b* is not connected to the first tilted main groove 100*a*. An outer end portion of the first tilted main groove 100*a* and an outer end portion of the second tilted main groove 100*b* are each open to the circumferential main groove 150 in the tread width direction. Moreover, the outer end portion of the first tilted main groove 100*a* and the outer end portion of the second tilted main groove 100*b* are each in communication with an inner end portion, in the tread width direction, of the outer tilted groove 130 in the tread width direction through the circumferential main groove 150.

There are multiple outer tilted grooves 130, and they are arranged in a tread side region Ts located on each outer side in the tread width direction. The outer tilted grooves 130 are formed on the outer side of the tilted main grooves 100 in the tread width direction. In other words, the tilted main grooves 100 are formed on the inner side of the outer tilted grooves 130 in the tread width direction. The outer tilted grooves 130 extend in the tread width direction. As shown in FIG. 1, the outer tilted grooves 130 may be tilted with respect to the tread width direction as viewed in the tire radial direction. The outer tilted grooves 130 extend in a tilt direction KS.

The circumferential main groove 150 extends in the tire circumferential direction. The circumferential main groove 150 is arranged at the boundary of the tread center region Tc and the tread side region Ts. In other words, the circumferential main groove 150 is arranged between the tilted main grooves 100 and the outer tilted grooves 130 in the tread width direction. One circumferential main groove 150 is arranged in each of the right tread part TR and the left tread part TL.

The tilted land portion 200 is sandwiched between the tilted main grooves 100. Specifically, the tilted land portion 200 is sandwiched between the tilted main grooves 100 in the tire circumferential direction. The tilted land portion 200 extends along the tilted main grooves 100. The tilted land portion 200 is divided into multiple blocks by the tilted narrow groove 300 and the branched narrow groove 350. Thus, the tilted land portion 200 is formed of multiple blocks.

The outer land portion 250 is sandwiched between the outer tilted grooves 130. Specifically, the outer land portion 250 is sandwiched between the outer tilted grooves 130 in the tire circumferential direction. The outer land portion 250 extends along the outer tilted grooves 130. Sipes extending in the tilt direction KS are formed in the outer land portion 250. A sipe extending in the tire circumferential direction is formed in the outer land portion 250 as well.

The tilted narrow groove 300 is formed in the tilted land portion 200. The tilted narrow groove 300 extends in the tilt direction KC. In FIGS. 1 and 2, the tilted narrow groove 300 extends in a zigzag shape in the tilt direction KC. The tilted narrow groove 300 extends in the zigzag shape in the tilt direction KC by alternately turning toward the upper tilted main groove 101 side and the lower tilted main groove 102 side. The portions at which the tilted narrow groove 300 turns are regarded as vertices 310. The tilted narrow groove 300 divides the tilted land portion 200. Specifically, the tilted narrow groove 300 divides the tilted land portion 200 in the tire circumferential direction.

An outer end portion of the tilted narrow groove 300 in the tread width direction is open to the circumferential main groove 150. An inner end portion of the tilted narrow groove 300 in the tread width direction is open to the tilted main groove 100 arranged on the opposite side of the tire equator line CL from the tilted narrow groove 300. In other words, in FIG. 1, the inner end portion, in the tread width direction, of the tilted narrow groove 300 formed in the right tread part TR is open to the second tilted main groove 100*b*. The inner end portion, in the tread width direction, of the tilted narrow groove 300 formed in the left tread part TL is open to the first tilted main groove 100*a*.

The branched narrow groove 350 is formed in the tilted land portion 200. The branched narrow groove 350 extends from the tilted narrow groove 300 to the tilted main grooves 100. The branched narrow groove 350 is formed of multiple branched narrow grooves. As shown in FIGS. 1 and 2, a branched narrow groove 351, a branched narrow groove 352, . . . , and a branched narrow groove 356 are formed in each tilted land portion 200.

The branched narrow grooves 350 include first branched narrow grooves 350*a* (a branched narrow groove 351, a branched narrow groove 353, and a branched narrow groove 355) which are open to the tilted narrow groove 300 and to the upper tilted main groove 101. The branched narrow grooves 350 include second branched narrow grooves 350*b* (a branched narrow groove 352, a branched narrow groove 354, and a branched narrow groove 356) which are open to the tilted narrow groove 300 and to the lower tilted main groove 102. The branched narrow grooves 350 extend to the tilted main grooves 100 only from the vertices 310. The first branched narrow grooves 350*a* and the second branched narrow grooves 350b are formed alternately in the tilt direction KC. In other words, the branched narrow groove 356, the branched narrow groove 355, the branched narrow groove 354, the branched narrow groove 353, the branched narrow groove 352, and the branched narrow groove 351 are formed in this order in the tilt direction KC from tire equator line CL in the tread width direction.

As shown in FIGS. 1 and 2, the tilted land portion 200 is formed of a block 201, a block 202, . . . , a block 206, and part of the block 230. The block 201 and the block 202 are quadrilateral blocks. The block 203, the block 204, the block 205, and the block 206 are pentagonal blocks.

The block 201 and the block 202 are surrounded by the tilted main groove 100, the circumferential main groove 150, the tilted narrow groove 300, and the branched narrow grooves 350. The block 203, . . . , and the block 206 are surrounded by the tilted main groove 100, the tilted narrow groove 300, and the branched narrow grooves 350. First blocks 210 formed of the block 203 and the block 205 are surrounded only by the tilted main groove 100, the tilted narrow groove 300, and the first branched narrow grooves 350a. Second blocks 220 formed of the block 204 and the block 206 are surrounded only by the tilted main groove 100, the tilted narrow groove 300, and the second branched narrow grooves 350b.

The block 203 and the block 205 are adjacent to each other in the tilt direction KC. The block 203 and the block 205 have the same shape. The block 204 and the block 206 are adjacent to each other in the tilt direction KC. The block 204 and the block 206 have the same shape. Here, the same shape does not have to be the exact same shape. Those with several-mm errors may be considered the same shape. The area of the surfaces of the first blocks 210 and second blocks 220 in contact with the road surface is between 100 mm$^2$ and 250 mm$^2$ both inclusive.

There are multiple blocks 230, and they are arranged side by side along the tire equator line CL. Each block 230 is surrounded by the first tilted main groove 100a, the second tilted main groove 100b, the tilted narrow grooves 300, and the branched narrow grooves 350. Each block 230 is arranged at the end portions of the tilted main grooves 100.

Sipes 270 are formed in the blocks forming the tilted land portion 200. Specifically, a sipe 271, a sipe 272, . . . and a sipe 276 are formed in the block 201, the block 202, . . . , and the block 206, respectively. A sipe 277 and a sipe 278 are formed in each block 230. Each sipe 270 is open to the tilted narrow groove 300. The sipe 271 is open also to the circumferential main groove 150. The other sipes are open only to the tilted narrow groove 300. Thus, both ends of the sipes formed in the first blocks 210 and the second blocks 220 are open only to the tilted narrow groove 300. Each sipe 270 except the sipe 278 is formed to bend once. The sipe 278 is formed straightly along the tire equator line CL. The sipe 278 is formed to a middle portion of its block. Thus, one end of the sipe 278 is open to the tilted narrow groove 300 while the other end is closed. The sipes 270 are formed in a zigzag shape in the tilted land portion 200 as viewed in the tire radial direction, when the sipes 271 to 278 are connected. That is, the sipes 270 formed in the blocks adjacent to each other in the tire circumferential direction and in the tread width direction are in communication with each other through the tilted narrow groove 300.

A tilt angle θ of the tilted main grooves 100 with respect to the tread width direction as viewed in the tire radial direction is preferably between 15 degrees and 75 degrees both inclusive. Moreover, an outer-groove angle φ of the outer tilted grooves 130 with respect to the tread width direction as viewed in the tire radial direction is preferably smaller than the tilt angle θ.

Assuming that a groove width refers to a width perpendicular to the extending direction of a groove as viewed in the tire radial direction, the groove widths of the tilted main grooves 100, the outer tilted grooves 130, and the circumferential main groove 150 are greater than the groove widths of the tilted narrow groove 300 and the branched narrow grooves 350. In this description, a sipe refers to one with such a groove width that the sipe can be closed when the block in which the sipe is formed comes into contact with the ground. Thus, the sipes 270 can be closed when their tilted land portion 200 comes into contact with the ground. In the embodiment, the groove widths of the tilted narrow groove 300 and the branched narrow grooves 350 are greater than the groove widths of the sipes 270. The groove widths of the sipes are 1.5 mm or smaller. However, the groove widths of the sipes may be 1.5 mm or greater in the case of a tire used for a large bus or truck such as a TBR tire.

For example, the groove width of the tilted main groove 100 is between 3.5 mm and 15 mm both inclusive. The groove width of the outer tilted grooves 130 is between 3.5 mm and 15 mm both inclusive. The groove width of the circumferential main groove 150 is between 3 mm and 15 mm both inclusive. The groove width of the tilted narrow groove 300 is between 0.3 mm and 3 mm both inclusive. The groove width of the branched narrow grooves 350 is between 0.3 mm and 3 mm both inclusive.

(2) Modifications of Tread Part 1

Figure 3:
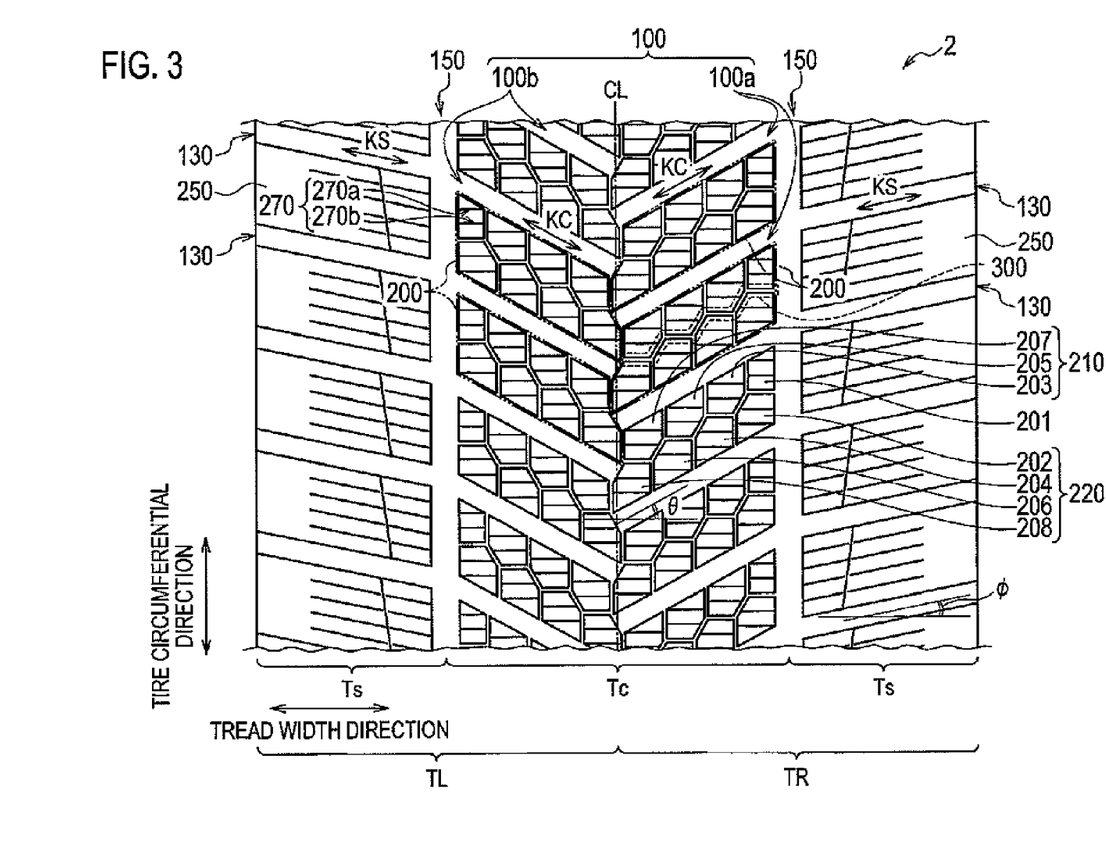
FIG. 3 is a developed view of the tread of a tire according to a modification of the embodiment.
Figure 4:
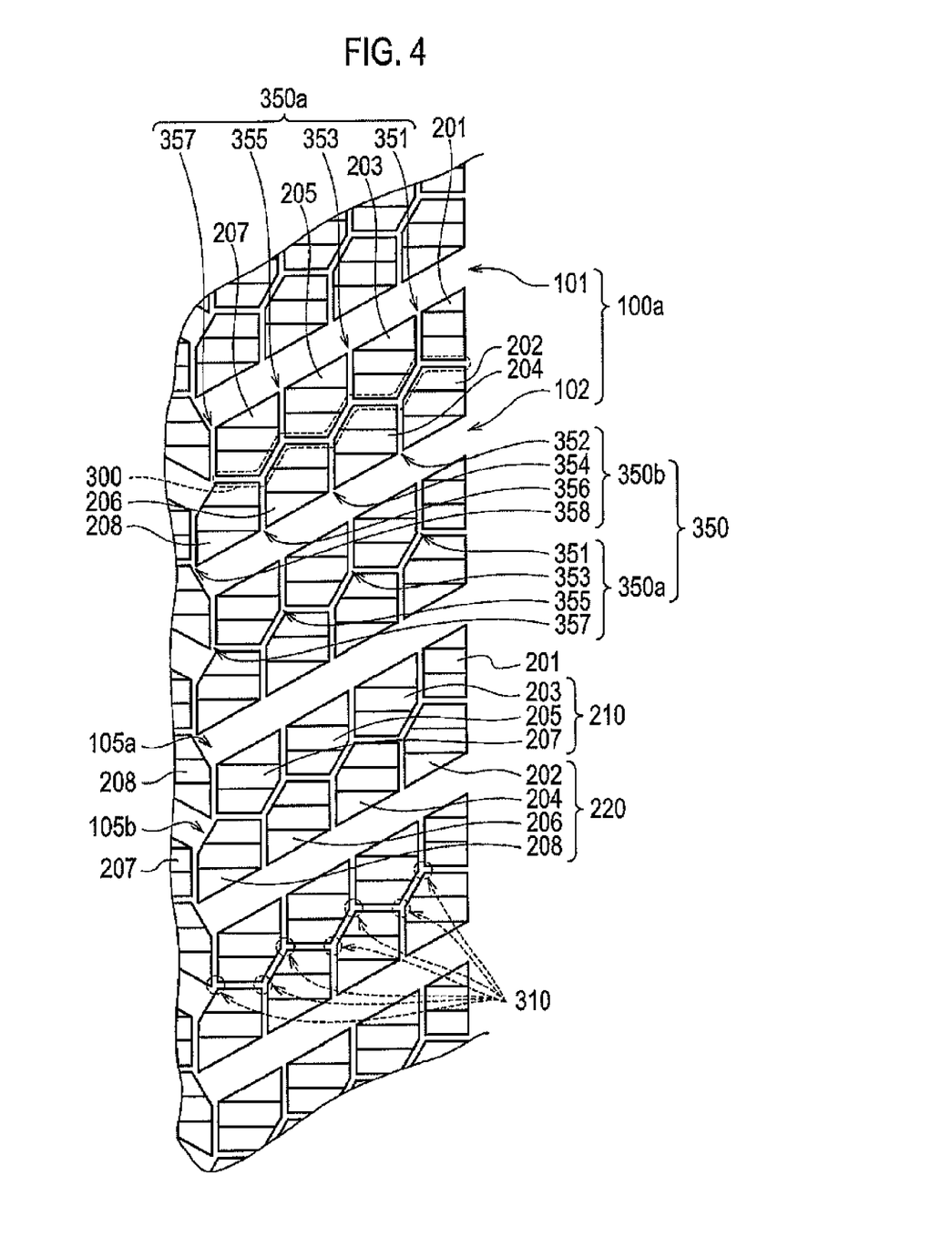
FIG. 4 is a partial enlarged view of FIG. 3.
Figure 5:
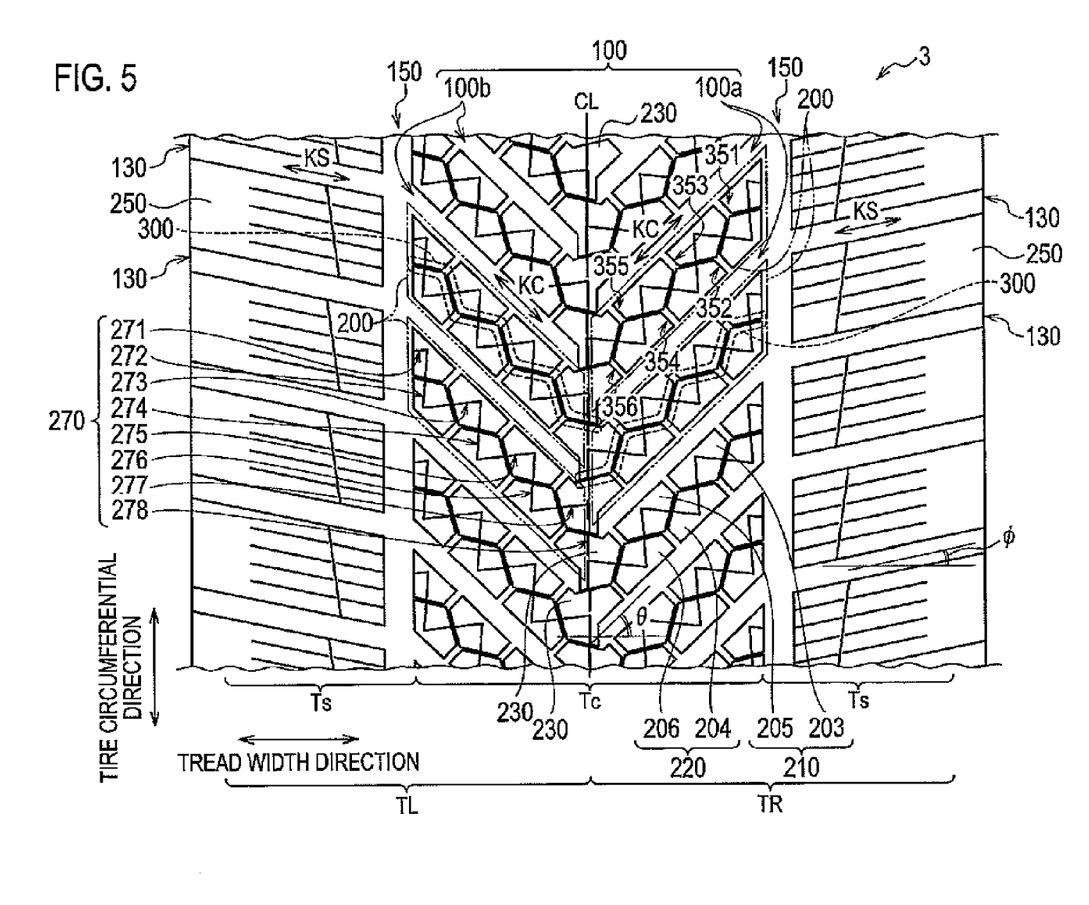
FIG. 5 is a developed view of the tread of a tire according to a modification of the embodiment.
Figure 6:
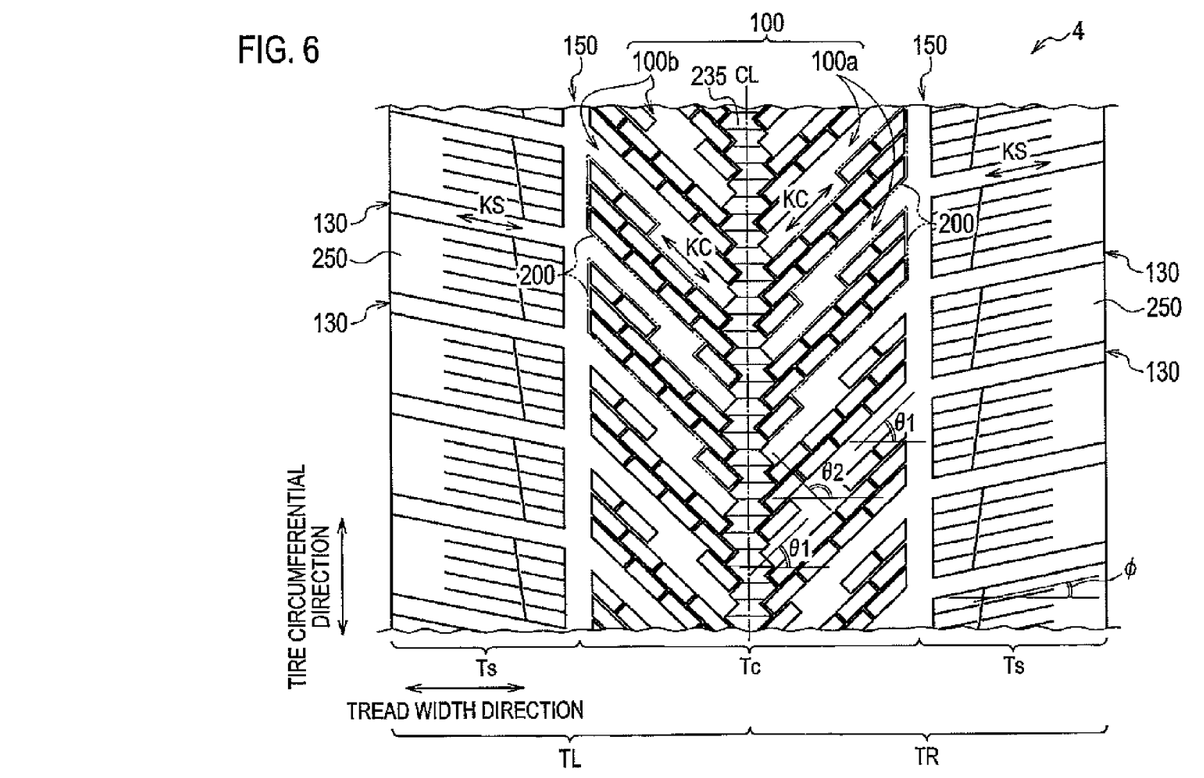
FIG. 6 is a developed view of the tread of a tire according to a modification of the embodiment.
Figure 7:
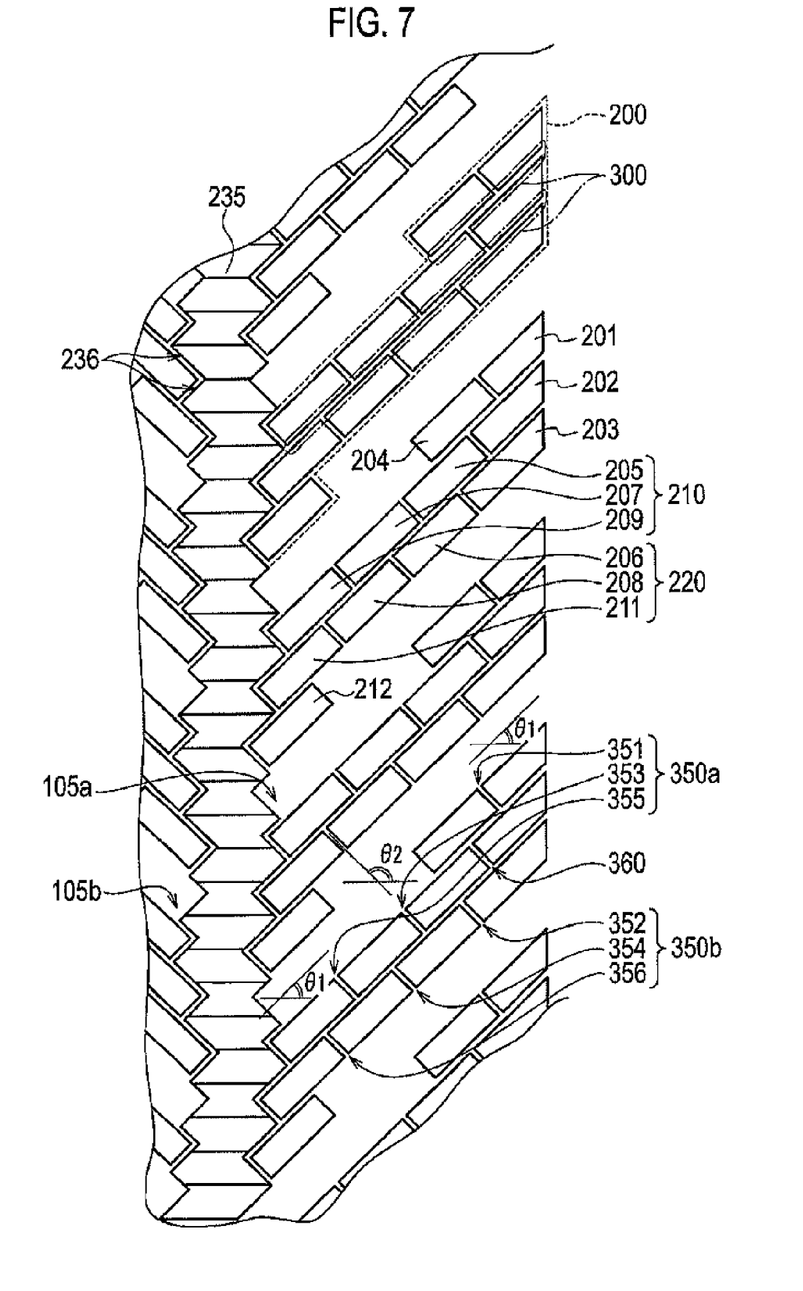
FIG. 7 is a partial enlarged view of FIG. 6.

Modifications of the tire according to the embodiment will be described with reference to FIGS. 3 to 7. In the following description, portions similar to those of the tire according to the foregoing embodiment will be omitted as appropriate. FIG. 3 is a developed view of the tread of a tire according to a modification of this embodiment. FIG. 4 is a partial enlarged view of FIG. 3. FIG. 5 is a developed view of the tread of a tire according to a modification of this embodiment. FIG. 6 is a developed view of the tread of a tire according to a modification of this embodiment. FIG. 7 is a partial enlarged view of FIG. 6.

(2.1) Modification 1 (Tread Part 2)

As shown in FIGS. 3 and 4, a block 208 is arranged on the inner side, in the tread width direction, of the first-tilted-main-groove end portion 105a. A block 208 is arranged on the inner side, in the tread width direction, of the second-tilted-main-groove end portion 105b. Specifically, a block 208 is arranged between the first-tilted-main-groove end portion 105a and the second-tilted-main-groove end portion 105b. In other words, the first-tilted-main-groove end portion 105a is not connected to the second tilted main groove 100b. The second-tilted-main-groove end portion 105b is not connected to the first tilted main groove 100a.

In this modification, the branched narrow grooves 350 extend in the tire circumferential direction.

As shown in FIGS. 3 and 4, the tilted land portion 200 is formed of a block 201, a block 202, . . . , and the block 208. The block 201 is a quadrilateral block. The block 202, . . . , and the block 208 are pentagonal blocks.

The block 201 and the block 202 are surrounded by the tilted main grooves 100, the circumferential main groove 150, the tilted narrow groove 300, and the branched narrow grooves 350. The block 203, . . . , and the block 208 are surrounded by the tilted main grooves 100, the tilted narrow groove 300, and the branched narrow grooves 350. First blocks 210 formed of the block 203, the block 205, and the block 207 are surrounded only by the tilted main groove 100, the tilted narrow groove 300, and the first branched narrow grooves 350a. Second blocks 220 formed of the block 202, the block 204, the block 206, and the block 208 are surrounded only by the tilted main groove 100, the tilted narrow groove 300, and the second branched narrow grooves 350b.

The first blocks 210 have the same shape. The second blocks 220 have the same shape. The area of the surfaces of the first blocks 210 and second blocks 220 in contact with the road surface is between 100 mm² and 250 mm² both inclusive.

Sipes 270 are formed in the blocks forming the tilted land portion 200. Each sipe 270 is formed of two sipes (a sipe 270a and a sipe 270b) extending in the tread width direction. The sipes 270 are formed in all of the blocks 201, the block 202, . . . , and the block 208.

Note that the groove width of the tilted main grooves 100, the groove width of the outer tilted grooves 130, the groove width of the circumferential main groove 150, the groove width of the tilted narrow groove 300, and the groove width of the branched narrow grooves 350 are similar to those in the embodiment described above.

(2.2) Modification 2 (Tread Part 3)

As shown in FIG. 5, the tilted narrow groove 300 is a sipe or a narrow groove. Thus, the tilted narrow groove 300 can be closed when the tilted land portion 200 comes into contact with the ground. In this modification, the groove width of the tilted narrow groove 300 is smaller than the groove width of the branched narrow grooves 350. Note that a narrow groove refers to a groove with a greater groove width than a sipe.

For example, the groove width of the tilted narrow groove 300 is between 0.3 mm and 3.5 mm both inclusive. The groove width of the branched narrow grooves 350 is between 0.3 mm and 3.5 mm both inclusive. The groove width of the tilted main grooves 100, the groove width of the outer tilted grooves 130, and the groove width of the circumferential main groove 150 are similar to those in the embodiment described above.

(2.3) Modification 3 (Tread Part 4)

As shown in FIG. 6, the tilted main grooves 100 extends while bending. The tilted main grooves 100 are such that the tilt angle of the tilted main grooves 100 with respect to the tread width direction changes partially. The tilted main grooves 100 bend in such a way as to have a tilt angle $\theta 1$ and a tilt angle $\theta 2$. The tilted main grooves 100 extend from the inner side in the tread width direction to the outer side in the tread width direction in such a way that the tilted main grooves 100 extend first at the tilt angle $\theta 1$, extend next at the tilt angle $\theta 2$ in the middle, and extend again at the tilt angle $\theta 1$. Thus, the tilted main grooves 100 extend in a stepped shape (with a step). Note that the outer-groove angle $\phi$ of the outer tilted grooves 130 with respect to the tread width direction is preferably smaller than the tilt angle $\theta 1$, as viewed in the tire radial direction.

There are two tilted narrow grooves 300 formed in the tilted land portion 200. The tilted narrow grooves 300 extend straightly in the tilt direction KC. The tilted narrow grooves 300 divide the tilted land portion 200 into three parts.

The branched narrow grooves 350 include the first branched narrow grooves 350a and the second branched narrow grooves 350b as well as a third branched narrow groove 360 which is open only to the tilted narrow grooves 300. Both ends of the third branched narrow groove 360 are open to the two tilted narrow grooves 300, respectively.

In this modification, the groove width of the tilted main grooves 100 varies because the tilted main grooves 100 are such that the tilt angle of the tilted main grooves 100 with respect to the tread width direction changes partially. For example, the groove width of the tilted main grooves 100 is between 3.5 mm and 15 mm both inclusive. Note that the groove width of the tilted narrow grooves 300 is between 0.3 mm and 3 mm both inclusive and that the groove width of the branched narrow grooves 350 between 0.3 mm and 3 mm both inclusive.

The tilted land portion 200 is formed of a block 201, a block 202, . . . , a block 209, a block 211, and a block 212. First blocks 210 formed of the block 205, the block 207, and the block 209 have the same shape. Second blocks 220 formed of the block 206, the block 208, and the block 211 have the same shape. The area of the surfaces of the first blocks 210 and second blocks 220 in contact with the road surface is between 100 mm² and 250 mm² both inclusive.

The tire according to this modification includes a land portion 235 formed on the tire equator line CL and extending along the tire equator line CL. Multiple sipes 236 extending in the tread width direction are formed in the land portion 235. The land portion 235 is arranged on the inner side, in the tread width direction, of the first-tilted-main-groove end portion 105a. The land portion 235 is arranged on the inner side, in the tread width direction, of the second-tilted-main-groove end portion 105b. That is, the land portion 235 is arranged between the first-tilted-main-groove end portion 105a and the second-tilted-main-groove end portion 105b. In other words, the first-tilted-main-groove end portion 105a is not connected to the second tilted main groove 100b. The second-tilted-main-groove end portion 105b is not connected to the first tilted main groove 100a.

The land portion 235 is a continuous body in the tire circumferential direction. Thus, the block rigidity of the land portion 235 is higher than when multiple blocks are arranged in the tire circumferential direction, thereby making the land portion 235 harder to deform. This in turn makes the actual ground contact area of the land portion 235 harder to decrease. Accordingly, the tire according to this modification can achieve good wet steering performance and dry steering performance.

(3) Comparative Evaluations

Figure 8:
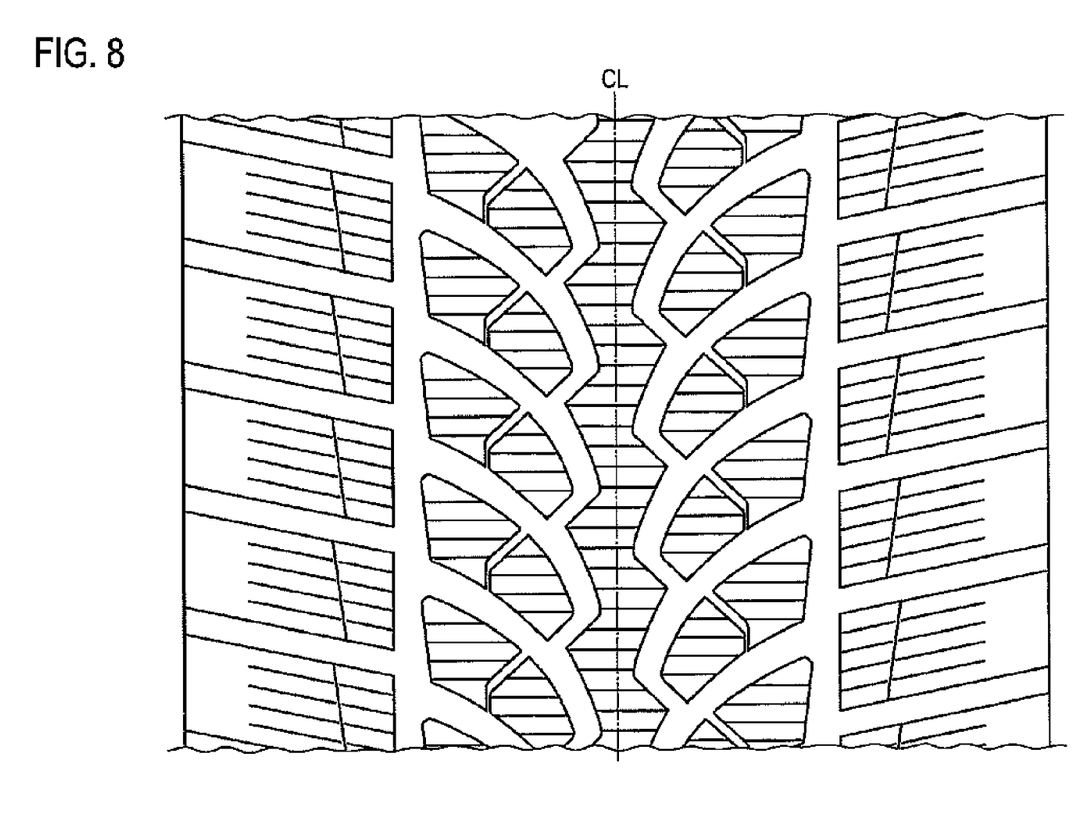
FIG. 8 is a developed view of the tread of a tire according to a comparative example.

To check effects of the tire according to the present invention, evaluations were carried out using tires according examples shown in Table 1 and a tire according to a comparative example including a tread part shown in FIG. 8. The tire according to Example 1 is a tire including the tread part 1 shown in FIG. 1. The tire according to Example 2 is a tire including the tread part 2 shown in FIG. 3. The tire according to Example 3 is a tire including the tread part 3 shown in FIG. 5.

TABLE 1

|  | Example 1 | Example 2 | Example 3 |
|---|---|---|---|
| Tilt Angle θ (Degrees) | 45 | 30 | 45 |
| Groove Width of Tilted Main Groove (mm) | 6.5 | 7.1 | 6.5 |
| Groove Width of Tilted Narrow Groove (mm) | 1.5 | 1.5 | 0.7 |
| Groove Width of Branched Narrow Groove (mm) | 1.5 | 1.5 | 2.5 |
| Area of First Blocks and Second Blocks (mm²) | 157 | 135 | 157 |

TABLE 1-continued

|  | Example 1 | Example 2 | Example 3 |
| --- | --- | --- | --- |
| Groove Width of Circumferential Main Groove (mm) | 8 | 8 | 8 |
| Outer-Groove Angle (Degrees) | 12 | 12 | 12 |
| Negative Ratio (%) | 37.3 | 37.4 | 36.3 |

Snow braking performance, snow traction performance, wet braking performance, hydroplaning performance, and dry steering performance were evaluated by using the above tires. The tires according to the examples were evaluated with the tire according to the comparative example as a reference (100). The tests were performed in a condition where each tire had a tire size of 225/45R17 and a rim size of 7.5J×17. The snow braking performance was found by measuring the braking distance taken to stop once full braking is applied at 40 km/h on a test course with a compressed snow road surface. The snow traction performance was found by measuring the time taken to travel a distance to accelerate from an initial speed of 10 km/h to 45 km/h on a test course with a compressed snow road surface. The wet braking performance was found by measuring the braking distance taken to stop once full braking is applied at 60 km/h on a wet road surface with 2-mm thick water thereon. The hydroplaning performance was found by measuring the upper limit speed at which hydroplaning occurred as a result of traveling straight on a wet road surface with 5-mm thick water thereon. The dry steering performance was found as an overall evaluation on braking performance, starting performance, straight traveling performance, and cornering performance on a test course with a dry asphalt road. In each measurement, a higher numerical value indicates better performance. The results are shown in Table 2.

TABLE 2

|  | Comparative Example | Example 1 | Example 2 | Example 3 |
| --- | --- | --- | --- | --- |
| Snow Braking Performance | 100 | 115 | 117 | 113 |
| Snow Traction Performance | 100 | 114 | 117 | 111 |
| Wet Braking Performance | 100 | 107 | 106 | 105 |
| Hydroplaning Performance | 100 | 109 | 103 | 107 |
| Dry Steering Performance | 100 | 104 | 102 | 107 |

As shown in Table 2, it was found that each of the tires according to the examples showed improvement in the braking and driving performance on low-μ road surfaces as compared to the tire according to the comparative example. Moreover, it was found that the tires according to the examples had improvement at least in the drainage performance because they showed improvement also in the wet braking performance and hydroplaning performance as compared to the tire according to the comparative example. Furthermore, it was found that the tires according to the examples had improvement in the steering performance not only on low-μ roads but also on normal roads because they showed improvement in the dry steering performance.

(4) Operations and Effects

In the tire according to the present invention, the tilted land portion 200 is divided into multiple blocks by the tilted narrow groove 300 and the branched narrow grooves 350. Thus, formed are multiple blocks smaller than those of the conventional pneumatic tires designed to achieve improvement in drainage performance and low-μ road performance. Accordingly, the number of block edges can be increased and the low-μ road performance can therefore be improved without forming many sipes in large blocks.

When the blocks are large, it is possible that the ground pressure may be different from one portion to another within a block. However, making the blocks small allows the ground pressure to be uniform within a block. This improves the ground contact of the block. The resultant surface friction effect between the road surface and the block can therefore improve the low-μ road performance. Moreover, the adjacent first blocks 210 have the same shape, and the adjacent second blocks 220 have the same shape. This makes the ground pressure uniform between the adjacent blocks. The blocks can therefore improve the ground contact as a whole. As a result, the low-μ road performance can be improved. Furthermore, in the tire according to the present invention, the tilted land portion 200 is divided into blocks with a small number of sides, i.e. quadrilateral and/or pentagonal blocks. This allows the blocks to be aligned neatly along lateral sides of the tilted land portion 200 and therefore allows the blocks to be arranged densely in the tilted land portion 200. Thus, a ground contact area as large as a large block can be ensured. Accordingly, the low-μ road performance can be improved.

The tire according to the present invention includes multiple tilted main grooves 100. Accordingly, the drainage performance can be maintained. In addition, a water film between the center region of the tilted land portion 200 and the road surface is removed through the tilted narrow groove 300 and the branched narrow grooves 350. Accordingly, the braking and driving performance on low-μ road surfaces can be improved while the drainage performance is maintained or improved.

In the tire according to the present invention, the area of the surfaces of the first blocks 210 and second blocks 220 in contact with the road surface is between 100 mm$^2$ and 250 mm$^2$ both inclusive. Setting the area of the first blocks 210 and second blocks 220 not smaller than 100 mm$^2$ improves the rigidity of each of the blocks forming the first blocks 210 and the second blocks 220 and therefore improves the steering performance on dry and wet road surfaces. Setting the area of the first blocks 210 and second blocks 220 not greater than 250 mm$^2$ allows formation of multiple blocks smaller than those of the conventional pneumatic tires. This improves the ground contact of each block. The resultant surface friction effect between the road surface and the block can therefore improve the low-μ road performance. Moreover, forming small blocks increases the number of edges as compared to the case of large blocks.

In the tire according to the present invention, the tilted narrow groove 300 extends in a zigzag shape in the tilt direction KC. This increases the total length of the tilted narrow groove 300 and therefore further improves the edge effect. Moreover, the zigzag tilted narrow groove 300 has an edge extending in at least two directions unlike a straight tilted narrow groove. Accordingly, grip can be applied in multiple directions on ice or snow or on wet road surfaces.

In the tire according to the present invention, the tilt angle θ is between 15 degrees and 75 degrees both inclusive. Setting the tilt angle θ not smaller than 15 degrees increases the component of each tilted main groove 100 in the tire circumferential direction. Thus, water having entered the tilted main groove 100 is likely to be discharged to the outer side in the tire circumferential direction by rotation of the tire. Accordingly, the drainage performance on wet road surfaces can be improved. Setting the tilt angle θ not greater than 75 degrees increases the number of edges having an angle that is effective for the snow traction performance and snow braking performance. Accordingly, the snow traction performance and snow braking performance can be improved.

In the tire according to the present invention, the tire includes the circumferential main groove 150. Accordingly, the drainage performance can be improved. Moreover, since the tire has edges extending in the circumferential direction, the cornering performance particularly on wet road surfaces can be improved.

In the tire according to the present invention, the tilted main grooves 100 extend while bending, and their tilt angle θ changes partially. Specifically, the tilted main grooves 100 bend in such a way as to have at least the tilt angle θ1 and the tilt angle θ2. The tilted main grooves 100 extend from the inner side in the tread width direction to the outer side in the tread width direction in such a way that the tilted main grooves 100 extend first at the tilt angle θ1, extend next at the tilt angle θ2 in the middle, and extend again at the tilt angle θ1. Thus, the tilted main grooves 100 extend in a stepped shape. In this way, the tilted land portion 200 has edges tilted at multiple angles. Accordingly, the cornering performance can be improved. Note that the tilted main groove 100 may be bent multiple times so as to have multiple stepped shapes.

In the tire according to the present invention, at least one of the tilted narrow groove 300 and the branched narrow grooves 350 is a sipe which can be closed when the tilted land portion 200 in which the tilted narrow groove 300 and the branched narrow grooves 350 are formed comes into contact with the ground. Thus, the blocks support each other during the ground contact state, and the block rigidity can therefore be improved. As a result, the wet steering performance and the dry steering performance are improved. Note that if the tilted narrow groove 300 and the branched narrow grooves 350 are narrow grooves with greater groove widths than sipes, the drainage performance in the center region of the tilted land portion 200 is further improved, which in turn improves the low-μ road performance.

In the tire according to the present invention, the tire includes the outer tilted grooves 130 and the outer land portion 250, the tilted main grooves 100 are formed on the inner side, in the tread width direction, of the outer tilted grooves 130, and the outer-groove angle φ of the outer tilted grooves 130 is smaller than the tilt angle θ. Thus, edges of the outer land portion 250 are more perpendicular to the tire circumferential direction than are edges of the tilted land portion 200. In this way, the rigidity of the block is improved. Accordingly, the dry steering performance and the wet steering performance are improved, and the uneven-wear resistance is improved as well.

In the tire according to the present invention, the tilted narrow groove 300 extends in a zigzag shape in the tilt direction KC by alternately turning toward the upper tilted main groove 101 side and the lower tilted main groove 102 side. The branched narrow grooves 350 extend to the tilted main grooves 100 only from the vertices 310. Blocks with acute corners will be formed if the branched narrow grooves 350 extend to the tilted main groove 100 from portions other than the vertices 310. However, by causing the branched narrow grooves 350 to extend to the tilted main groove 100 only from the vertices 310, blocks with acute corners will not be formed, and therefore the uneven-wear resistance of the block is improved.

In the tire according to the present invention, the first branched narrow grooves 350a and the second branched narrow grooves 350b are formed alternately in the tilt direction KC. Thus, the blocks forming the first blocks 210 and the blocks forming the second blocks 220 are disposed alternately, and the block rigidity of the whole tilted land portion 200 is therefore improved. As a result, the dry steering performance and the wet steering performance are improved.

The tire according to the present invention includes the first tilted main groove 100a and the second tilted main groove 100b, and the land portion 235 or the blocks 230 is arranged between the first-tilted-main-groove end portion 105a and the second-tilted-main-groove end portion 105b. Thus, formed in a center portion on the tire equator line CL is a block(s) rather than a groove. Accordingly, the rigidity of the center portion on the tire equator line CL is improved. As a result, the dry steering performance and the wet steering performance are improved.

(5) Other Embodiments

The contents of the present invention have been disclosed through an embodiment of the present invention. However, it should not be understood that the description and drawings which constitute part of this disclosure limit the present invention. The present invention includes various other embodiments not described herein.

For example, while the tilted main grooves 100 are straight in the embodiment, the present invention is not necessarily limited to such a configuration. The tilted main grooves 100 may be curved. A straight tilted main groove 100 improves the drainage performance, whereas a curved tilted main groove 100 improves the drainage performance during cornering. Note that it is preferable to adjust the curvature of such a tilted main groove 100 optionally in accordance with the goal performance.

Moreover, while the tilted narrow groove 300 is a sipe and each branched narrow groove 350 is a narrow groove in the modifications, the present invention is not limited to such a configuration. It is possible that the tilted narrow groove 300 be a narrow groove and each branched narrow groove 350 be a sipe. That is, the groove width of the tilted narrow groove 300 may be greater than the groove width of the branched narrow groove 350. Alternatively, the tilted narrow groove 300 and the branched narrow groove 350 may both be a sipe. In this case, the block rigidity of the tilted land portion 200 can be improved. Accordingly, the dry steering performance and the wet steering performance can be improved.

The tire according to the present invention may be a pneumatic tire or a tire filled with rubber. Alternatively, the tire according to the present invention may be a tire filled with a gas other than air such as a rare gas including argon or the like.

The technical scope of the present invention is determined only by the matters to define the invention in the claims regarded as appropriate based on the above description.

Note that the entire content of Japanese Patent Application No. 2010-176490 (filed on Aug. 5, 2010) is incorporated herein by reference.

INDUSTRIAL APPLICABILITY

The present invention can provide a tire including multiple tilted main grooves which are tilted with respect to the tread width direction and blocks which are defined by the tilted main grooves, the tire having improved braking and driving performance on low-μ road surfaces while the drainage performance is maintained or improved.

The invention claimed is:

1. A tire comprising, in a tread part:
a plurality of tilted main grooves tilted with respect to a tread width direction as viewed in a tire radial direction and arranged side by side in a tire circumferential direction;
a tilted land portion sandwiched between the tilted main grooves and extending along the tilted main grooves;
a tilted narrow groove formed in the tilted land portion, extending in a tilt direction, and dividing the tilted land portion, the tilt direction being an extending direction of the tilted main groove; and
a plurality of branched narrow grooves formed in the tilted land portion and extending to the tilted main grooves from the tilted narrow groove, wherein
the tilted land portion is divided into a plurality of blocks by the tilted narrow groove and the branched narrow grooves,
the tilted main grooves include one tilted main groove and another tilted main groove given adjacent to the one tilted main groove and sandwiching the tilted land portion therebetween,
the branched narrow grooves include a plurality of first branched narrow grooves and a plurality of second branched narrow grooves, the first branched narrow grooves being open to the tilted narrow groove and the one tilted main groove, the second branched narrow grooves being open to the tilted narrow groove and the other tilted main groove,
the blocks include a plurality of first blocks and a plurality of second blocks, the first blocks being surrounded by the tilted main groove, the tilted narrow groove, and the first branched narrow grooves, the second blocks being surrounded by the tilted main groove, the tilted narrow groove, and the second branched narrow grooves,
the first blocks and the second blocks have pentagonal shapes as viewed in the tire radial direction,
of the first blocks, one first block and another first block adjacent to the one first block in the tilt direction have the same shape, and
of the second blocks, one second block and another second block adjacent to the one second block in the tilt direction have the same shape.

2. The tire according to claim 1, wherein an area of surfaces of the first blocks and the second blocks in contact with a road surface is between 100 mm$^2$ and 250 mm$^2$ both inclusive.

3. The tire according to claim 1, wherein the tilted narrow groove extends in a zigzag shape in the tilt direction.

4. The tire according to claim 1, wherein a tilt angle of the tilted main grooves with respect to the tread width direction as viewed in the tire radial direction is between 15 degrees and 75 degrees both inclusive.

5. The tire according to claim 1, wherein the tire further comprises a circumferential main groove extending in the tire circumferential direction.

6. The tire according to claim 1, wherein each of the tilted main grooves extends while bending, and a tilt angle of the tilted main groove with respect to the tread width direction changes partially.

7. The tire according to claim 1, wherein at least one of the tilted narrow groove and the branched narrow grooves is a sipe that is closable when the tilted land portion in which the tilted narrow groove and the branched narrow grooves are formed comes into contact with the ground.

8. The tire according to claim 1, wherein
the tire further comprises a plurality of outer tilted grooves arranged on an outer side in the tread width direction and an outer land portion sandwiched between the outer tilted grooves in the tire circumferential direction and extending along the outer tilted grooves,
the tilted main grooves are formed on an inner side, in the tread width direction, of the outer tilted grooves, and
a tilt angle of the outer tilted grooves with respect to the tread width direction as viewed in the tire radial direction is smaller than a tilt angle of the tilted main grooves with respect to the tread width direction.

9. The tire according to claim 1, wherein
the tilted narrow groove extends in a zigzag shape in the tilt direction by alternately turning toward the one tilted main groove side and the other tilted main groove side, and
when portions at which the tilted narrow groove turns are regarded as vertices, the branched narrow grooves extend to the tilted main grooves only from the vertices.

10. The tire according to claim 1, wherein the first branched narrow grooves and the second branched narrow grooves are formed alternately in the tilt direction.

11. The tire according to claim 1, wherein
the tilted main grooves include a first tilted main groove and a second tilted main groove, the first tilted main groove being arranged on one of outer sides in the tread width direction with respect to a tire equator line, the second tilted main groove being arranged the other of the outer sides in the tread width direction with respect to the tire equator line, and
a land portion or the blocks being formed on the tire equator line and extending along the tire equator line is arranged between an inner end portion, in the tread width direction, of the first tilted main groove and an inner end portion, in the tread width direction, of the second tilted main groove.

* * * * *